(12) United States Patent
Ohtsuki

(10) Patent No.: US 6,928,307 B2
(45) Date of Patent: Aug. 9, 2005

(54) FOLDABLE CELLULAR PHONE HAVING A FUNCTION OF TRANSMITTING AND RECEIVING E-MAIL AND METHOD OF OPERATING THE SAME

(75) Inventor: Michihito Ohtsuki, Tokyo (JP)

(73) Assignee: NEC Corporation, Tokyo (JP)

( * ) Notice: Subject to any disclaimer, the term of this patent is extended or adjusted under 35 U.S.C. 154(b) by 595 days.

(21) Appl. No.: 09/859,947

(22) Filed: May 17, 2001

(65) Prior Publication Data

US 2002/0006785 A1 Jan. 17, 2002

(30) Foreign Application Priority Data

May 19, 2000 (JP) ........................................ 2000-147733

(51) Int. Cl.[7] ................................................. H04B 1/38
(52) U.S. Cl. ........................ 455/567; 455/550; 455/575; 455/445; 455/458
(58) Field of Search ................................ 455/567, 412, 455/413, 414, 564, 575; 379/88.01, 88.02, 88.05, 88.07, 88.13, 88.16

(56) References Cited

U.S. PATENT DOCUMENTS

| | | | |
|---|---|---|---|
| 5,307,059 A | 4/1994 | Connary et al. | |
| 5,771,469 A | 6/1998 | Toba | |
| 6,018,671 A | * 1/2000 | Bremer | 455/567 |
| 6,333,973 B1 | * 12/2001 | Smith et al. | 379/88.12 |
| 6,456,696 B1 | * 9/2002 | Fargano et al. | 379/70 |
| 6,456,706 B1 | * 9/2002 | Blood et al. | 379/188 |
| 6,625,257 B1 | * 9/2003 | Asaoka et al. | 379/88.01 |

FOREIGN PATENT DOCUMENTS

| | | |
|---|---|---|
| GB | 2 314 185 A | 12/1997 |
| GB | 2 329 092 A | 3/1999 |
| GB | 2 333 209 A | 7/1999 |
| GB | 2 339 648 A | 2/2000 |
| GB | 2339648 | 2/2000 |
| GB | 2 349 305 A | 10/2000 |
| JP | 8-97854 | 4/1996 |
| JP | 10-224861 | 8/1998 |
| JP | 11-17839 | 1/1999 |
| JP | 11-102198 | 4/1999 |
| JP | 11-308669 | 11/1999 |
| JP | 2000-78304 | 3/2000 |
| JP | 2000-307730 | 11/2000 |

OTHER PUBLICATIONS

Combined Search and Examination Report under Sections 17 and 18(3); Dec. 18, 2001.
Search Report dated Jun. 19, 2002.
UK Patent Office Search Report issued Nov. 8, 2002.

* cited by examiner

*Primary Examiner*—Allan Hoosain
(74) *Attorney, Agent, or Firm*—Dickstein, Shapiro, Morin & Oshinsky, LLP

(57) ABSTRACT

A cellular phone includes (a) at least two annunciators each of which informs a user of at least one of receipt of an e-mail and content of a received e-mail, (b) an e-mail analyzer which detects an address of a transmitter of the received e-mail and characteristics of the received e-mail, and transmits a first detection signal in accordance with the detection, (c) a first detector which detects whether the cellular phone is folded, and transmits a second detection signal in accordance with the detection, (d) a second detector which detects whether the cellular phone is connected to an adapter in a vehicle, and transmits a third detection signal in accordance with the detection, and (e) a controller which selects one of the two annunciators in accordance with the first to third detection signals, and operates the thus selected annunciator.

13 Claims, 6 Drawing Sheets

FOLDABLE CELLULAR PHONE HAVING A FUNCTION OF TRANSMITTING AND RECEIVING E-MAIL AND METHOD OF OPERATING THE SAME

BACKGROUND OF THE INVENTION

1. Field of the Invention

The invention relates to a cellular phone and a method of operating the same, and more particularly to a foldable cellular phone and a method of operating the same at the time it receives a call.

2. Description of the Related Art

A cellular phone is always with a user. However, a user cannot respond to a call in some cases. For instance, while a user is driving a car, even if a cellular phone receives a call, he/she cannot respond to the call. For another instance, while a user is driving a car, even if a cellular phone receives an e-mail, he/she knows receipt of an e-mail through phone rings, though he/she cannot see a content of the received e-mail.

Thus, there is a need of a cellular phone which makes it possible for a user to confirm a content of a received e-mail, when he/she cannot do so.

In response to such a need, Japanese Unexamined Patent Publication No. 8-97854 suggests a cellular phone which displays a content of a received e-mail in a display screen immediately when an e-mail is received.

Japanese Unexamined Patent Publication No. 10-224861 has suggested a cellular phone including means for detecting whether the cellular phone receives voice communication or an e-mail, means for starting communication when voice communication is received, and means for, when an e-mail is received, storing a received e-mail into a memory, and displaying a content of the received e-mail in a display screen.

Japanese Unexamined Patent Publication No. 2000-307730 has suggested a cellular phone including means for outputting a content of a received e-mail through synthesized voices, and means for displaying a content of a received e-mail in a display screen.

The above-mentioned cellular phones are designed, on receipt of an e-mail, to display a content of a received e-mail or output a content of a received e-mail through synthesized voices.

Accordingly, if a user selected annunciation through synthesized voices, but forgot selecting annunciation through synthesized voices, annunciation of receipt of an e-mail is made through synthesized voices, even in cases that a user does not want to be annunciated through synthesized voices.

In particular, if a user has a foldable cellular phone, a user cannot see an e-mail displayed on a display screen unless he/she opens a folded cellular phone.

Hence, for instance, when a user is driving a car, he/she cannot immediately confirm a content of a received e-mail.

While a user is driving a car, a foldable cellular phone is usually folded or closed. If a user wants to confirm whether annunciation of a content of a received e-mail through synthesized voices is set, or if a user sets annunciation of a content of a received e-mail through synthesized voices, while he/she is driving a car, he/she has to open a folded cellular phone with both hands. Hence, it is quite difficult or almost impossible to confirm how a cellular phone is being set, or set a cellular phone in his/her desired manner.

As a result, a user has to bear in his/her mind whether he/she selected annunciation through synthesized voices.

As explained so far, the above-mentioned conventional cellular phones are accompanied with a problem that annunciation is not made when necessary, because a user forgot setting annunciation through synthesized voices, and that annunciation is made when unnecessary, because a user forgot turning off annunciation through synthesized voices.

In order to solve such a problem, Japanese Patent Application No. 11-336381 (not yet published) has suggested a cellular phone which annunciates a content of a received e-mail through synthesized voices in accordance with setting made by a user.

In accordance with the suggested cellular phone, after a user confirmed receipt of an e-mail, if a user operates the cellular phone in a predetermined manner, a content of a received e-mail is reproduced through synthesized voices.

However, it is necessary for a user to carry out a predetermined operation to the cellular phone in order to reproduce a content of a received e-mail through synthesized voices. Thus, for instance, when a user is driving a car, he/she cannot carry out the predetermined operation to the cellular phone, and hence, he/she cannot confirm a content of a received e-mail.

It should be noted that the above-mentioned Japanese Unexamined Patent Publication No. 2000-307730 and Japanese Patent Application No. 11-336381 do not constitute statutory prior art to the present invention. They are explained herein only for the purpose of better understanding of the present invention. The explanation of the Publication and Application does not mean that the applicant admits that they constitute statutory prior art to the present invention.

SUMMARY OF THE INVENTION

In view of the above-mentioned problems in the conventional cellular phones, it is an object of the present invention to provide a cellular phone which is capable of minimizing work volume which a user has to perform for setting a cellular phone into his/her desired mode, and determining whether a content of a received e-mail is annunciated through synthesized voices, in accordance with a condition in which a use is.

It is also an object of the present invention to provide a method of operating a cellular phone which method is capable of doing the same.

In one aspect of the present invention, there is provided a cellular phone including (a) at least two annunciators each of which informs a user of at least one of receipt of an e-mail and content of a received e-mail, (b) an e-mail analyzer which detects an address of a transmitter of the received e-mail and characteristics of the received e-mail, and transmits a first detection signal in accordance with the detection, and (c) a controller which selects one of the two annunciators in accordance with the first detection signal, and operates the thus selected annunciator.

The controller identifies a transmitter of an e-mail, based on an address indicated in the first detection signal transmitted from the e-mail analyzer. Hence, for instance, when a received e-mail includes a content which will make no problems if it is annunciated through voices, such as weather report or traffic news, the controller operates an annunciator which annunciates a content of an e-mail through voices, to thereby inform a user of a content of a received e-mail. On the other hand, when a received e-mail is a private one, the controller informs a user only of receipt of an e-mail without annunciating a content of a received e-mail through voices, or displays a content of a received e-mail on a display screen.

Herein, characteristics of an e-mail indicates whether a received e-mail is allowed be annunciated through voices.

The controller judges characteristics of a received e-mail, based on the first detection signal transmitted from e-mail analyzer. If the received e-mail is allowed to be annunciated through voices, the controller informs a user only of receipt of an e-mail without annunciating a content of a received e-mail through voices, or displays a content of a received e-mail on a display screen.

In accordance with the cellular phone, the controller selects an appropriate annunciator in accordance with the first detection signal transmitted from the e-mail analyzer, and operates the thus selected annunciator. Hence, annunciation can be appropriately made to a user in accordance with an address and/or characteristics of a received e-mail.

Herein, the term "a content of a received e-mail" means all information about a received e-mail, such as a name and an address of an e-mail transmitter, a subject matter of an e-mail, date and time at which an e-mail has been received, or sentences of an e-mail.

It is preferable that the cellular phone further includes a mode judge which judges which mode the cellular phone is in, and transmits a second detection signal in accordance with the judgment, in which case, the controller selects one of the two annunciators in accordance with the first and second detection signals, and operates the thus selected annunciator.

A cellular phone is usually designed to have various modes such as a drive mode in which a caller is informed that a called one is now driving a car, and a manner mode in which any voice output is prohibited.

The mode judge detects which mode the cellular phone is now in, and transmits a second detection signal in accordance with the detection. On receipt of the first and second detection signals, the controller selects one of the annunciators in accordance with the first and second detection signals, and operates the thus selected annunciator. Thus, annunciation can be appropriately made to a user in accordance with characteristics of a received e-mail and a mode in which the cellular phone is.

Each of the annunciators may be comprised of (a1) a voice synthesizer which synthesizes voices indicating a content of the received e-mail, (a2) a display unit which displays a content of the received e-mail on a display screen, and (a3) an informer which informs a user of receipt of an e-mail, alone or in combination.

For instance, the informer may be comprised of a light emitting diode (LED) turned on and off when a call or an e-mail is received, or a vibrator which vibrates a body of the cellular phone when a call or an e-mail is received.

However, it should be noted that the annunciator is not to be limited to those, but the annunciator may have any structure if it can make annunciation in any way.

There is further provided a cellular phone including (a) at least two annunciators each of which informs a user of at least one of receipt of an e-mail and content of a received e-mail, (b) an e-mail analyzer which detects an address of a transmitter of the received e-mail, and transmits a first detection signal in accordance with the detection, (c) a first detector which detects whether the cellular phone is folded, and transmits a second detection signal in accordance with the detection, and (d) a controller which selects one of the two annunciators in accordance with the first and second detection signals, and operates the thus selected annunciator.

The above-mentioned cellular phone makes use of a foldable structure. It is usually considered that a foldable cellular phone is not in use if it is folded. Hence, when the controller receives the second detection signal indicating that the cellular phone is not folded, from the first detector, the controller assumes that the cellular phone is in use, or when the controller receives the second detection signal indicating that the cellular phone is folded, from the first detector, the controller assumes that the cellular phone is not in use.

The controller identifies a transmitter of an e-mail, based on an address indicated in the first detection signal transmitted from the e-mail analyzer. Hence, for instance, when a received e-mail includes a content which will make no problems if it is annunciated through voices, such as weather report or traffic news, the controller further judges whether the cellular phone is folded or not, in accordance with the second detection signal. If the cellular phone is not folded, the controller operates an annunciator which annunciates a content of an e-mail through voices, for instance, to thereby inform a user of a content of a received e-mail. If the cellular phone is folded, the controller informs a user only of receipt of an e-mail, or displays a content of a received e-mail on a display screen.

On the other hand, when a received e-mail is a private one, the controller informs a user only of receipt of an e-mail without annunciating a content of a received e-mail through voices, or displays a content of a received e-mail on a display screen.

In accordance with the cellular phone, the controller selects an appropriate annunciator in accordance with both the first detection signal transmitted from the e-mail analyzer and the second detection signal transmitted from the first detector, and operates the thus selected annunciator. Hence, annunciation can be appropriately made to a user in accordance with an address and/or characteristics of a received e-mail and further with whether the cellular phone is folded or not.

There is still further provided a cellular phone including (a) at least two annunciators each of which informs a user of at least one of receipt of an e-mail and content of a received e-mail, (b) a first detector which detects whether the cellular phone is folded, and transmits a first detection signal in accordance with the detection, (c) a second detector which detects whether the cellular phone is connected to an adapter in a vehicle, and transmits a second detection signal in accordance with the detection, and (d) a controller which selects one of the two annunciators in accordance with the first and second detection signals, and operates the thus selected annunciator.

It is usually considered that a user of a cellular phone is driving a car, if the cellular phone is connected to an adapter in a vehicle. Hence, when the controller receives the second detection signal indicating that the cellular phone is connected to the adapter, from the second detector, the controller assumes that the cellular phone is not in use, or when the controller receives the second detection signal indicating that the cellular phone is not connected to the adapter, from the second detector, the controller assumes that the cellular phone is in use.

In accordance with the cellular phone, the controller selects an appropriate annunciator in accordance with the first detection signal transmitted from the first detector and the second detection signal transmitted from the second detector, and operates the thus selected annunciator. Hence, annunciation can be appropriately made to a user in accordance with whether the cellular phone is folded or not, and further with whether the cellular phone is connected to the adapter in a vehicle.

There is yet further provided a cellular phone including (a) at least two annunciators each of which informs a user of at least one of receipt of an e-mail and content of a received e-mail, (b) an e-mail analyzer which detects an address of a transmitter of the received e-mail and characteristics of the received e-mail, and transmits a first detection signal in accordance with the detection, (c) a first detector which detects whether the cellular phone is folded, and transmits a second detection signal in accordance with the detection, (d) a second detector which detects whether the cellular phone is connected to an adapter in a vehicle, and transmits a third detection signal in accordance with the detection, and (e) a controller which selects one of the two annunciators in accordance with the first to third detection signals, and operates the thus selected annunciator.

In accordance with the cellular phone, the controller selects an appropriate annunciator in accordance with the first detection signal transmitted from the e-mail analyzer, the second detection signal transmitted from the first detector, and the third detection signal transmitted from the second detector, and operates the thus selected annunciator. Hence, annunciation can be appropriately made to a user in accordance with an address and/or characteristics of a received e-mail, and further with whether the cellular phone is folded or not, and still further with whether the cellular phone is connected to the adapter in a vehicle.

For instance, the controller operates the voice synthesizer when the cellular phone is connected to the adapter. As an alternative, the controller operates the informer when the cellular phone is not connected to the adapter and the cellular phone is folded. As an alternative, the controller operates the voice synthesizer when the cellular phone is not connected to the adapter and the cellular phone is not folded.

In another aspect of the present invention, there is provided a method of operating a cellular phone, including the steps of (a) detecting an address of a transmitter of a received e-mail and characteristics of the received e-mail, and judging whether the received e-mail can be annunciated to a user through voices, (b) detecting whether the cellular phone is connected to an adapter in a vehicle, and (c) outputting a content of the received e-mail through voices when the cellular phone is connected to the adapter.

In accordance with the cellular phone, a content of a received e-mail can be appropriately informed to a user in dependence on an address and/or characteristics of a received e-mail, and further on whether the cellular phone is connected to the adapter.

There is further provided a method of operating a cellular phone, including the steps of (a) detecting an address of a transmitter of a received e-mail and characteristics of the received e-mail, and judging whether the received e-mail can be annunciated to a user through voices, (b) detecting whether the cellular phone is connected to an adapter in a vehicle, (c) detecting whether the cellular phone is folded, when the cellular phone is not connected to the adapter, and (d) outputting a content of the received e-mail through voices when the cellular phone is not folded.

In accordance with the cellular phone, a content of a received e-mail can be appropriately informed to a user in dependence on an address and/or characteristics of a received e-mail, and further on whether the cellular phone is connected to the adapter, and still further on whether the cellular phone is folded.

There is still further provided a method of operating a cellular phone, including the steps of (a) detecting an address of a transmitter of a received e-mail and characteristics of the received e-mail, and judging whether the received e-mail can be annunciated to a user through voices, (b) detecting whether the cellular phone is connected to an adapter in a vehicle, (c) detecting whether the cellular phone is folded, when the cellular phone is not connected to the adapter, and (d) informing a user of receipt of the received e-mail, when the cellular phone is folded.

In accordance with the cellular phone, a content of a received e-mail can be appropriately informed to a user in dependence on an address and/or characteristics of a received e-mail, and further on whether the cellular phone is connected to the adapter, and still further on whether the cellular phone is folded.

As mentioned so far, in accordance with the present invention, whether a content of a received e-mail is annunciated to a user through voices is automatically determined in dependence on circumference of a user. Hence, even if a user cannot manipulate a cellular phone, because he/she is driving a car, for instance, he/she can confirm a content of a received e-mail without carrying out any operation to a cellular phone.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
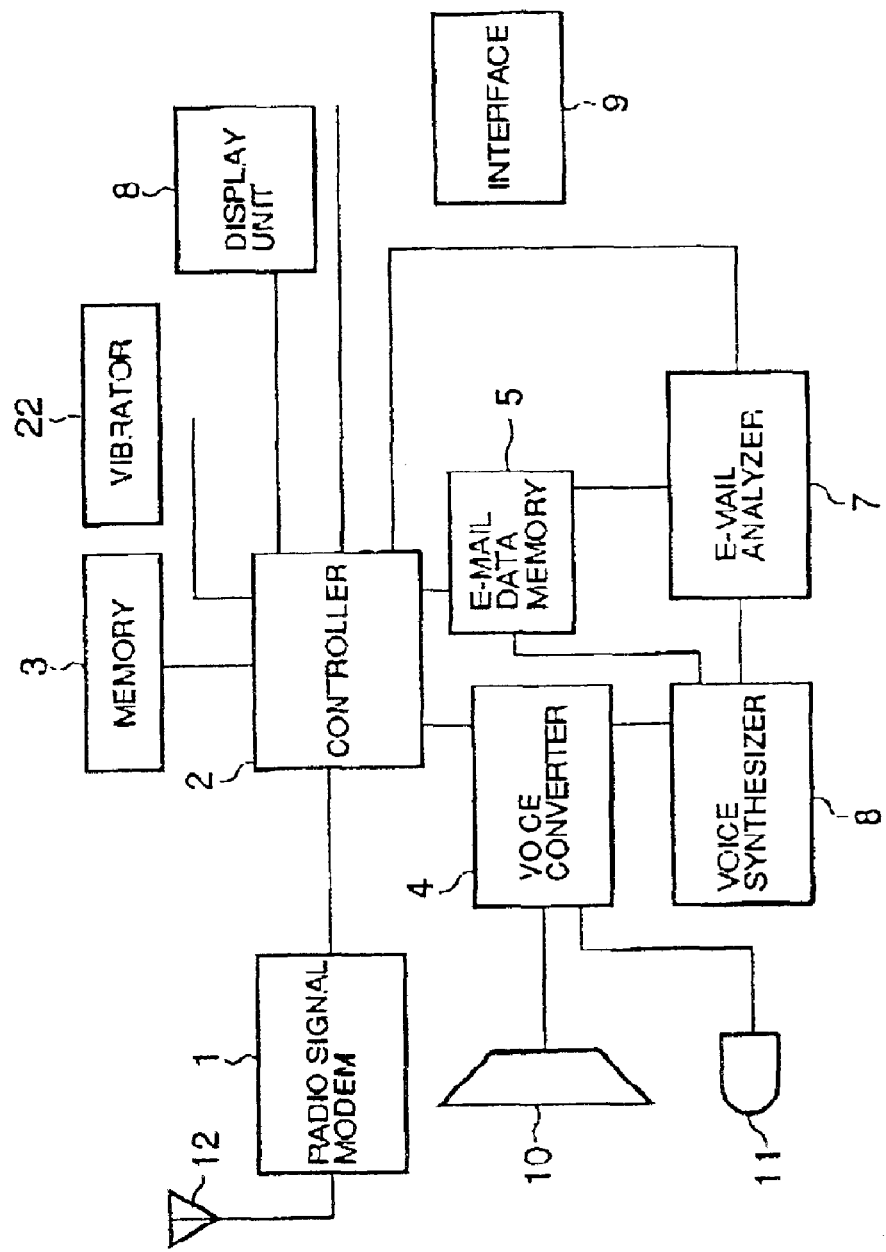
FIG. 1 is a block diagram of a cellular phone in accordance with the first embodiment of the present invention.

FIG. 1 is a block diagram of a cellular phone in accordance with the first embodiment.

The illustrated cellular phone is comprised of an antenna 12 through which a radio signal is received and transmitted, a radio signal modem 1 which modulates a radio signal to be transmitted therefrom and demodulates a received radio signal, a controller 2 comprised of LSI and receiving demodulated radio signals from the radio signal modem 1, a memory 3 storing data such as data indicating conditions in which the cellular phone is set, a voice converter 4 which converts radio signals into voice signals when a received radio signal is comprised of voice signals, an e-mail data memory 5 storing content of received e-mails, a voice synthesizer 6 which synthesizes voices when a content of a received e-mail is to be output through voices, a speaker 10 which outputs the voice signals converted by the voice converter 4, through voices synthesized by the voice synthesizer 6, a microphone 11 which collects voices of a user, an e-mail analyzer 7 which detects an address of a transmitter of a received e-mail and characteristics of a received e-mail, and transmits a first detection signal in accordance with the detection, a display unit 8 which displays various data such as a content of a received e-mail, an interface 9 through which a user inputs data into the controller 2, and a vibrator 22 which vibrates a body of the cellular phone.

The cellular phone in accordance with the first embodiment operates as follows.

When an e-mail is received, the radio signal modem 1 processes the received radio signals, for instance, demodulates the received radio signals.

Then, the e-mail analyzer 7 detects an address of a transmitter and characteristics of the received e-mail, and transmits a first detection signal indicative of the thus detected address and characteristics, to the controller 2.

The controller 2 judges whether the received e-mail is allowed to be annunciated through voices, based on the characteristics of the received e-mail, indicated in the first detection signal.

The controller 2 further identifies a transmitter of the received e-mail by virtue of the address indicated in the first detection signal, and annunciates a content of the received e-mail to a user in accordance with a transmitter of the received e-mail.

For instance, when the received e-mail is allowed to be annunciated through voices and a transmitter of the received e-mail is a data source which transmits various data such as weather report or traffic news, the controller 2 judges that there will be caused no problems even if a content of the received e-mail is annunciated through voices, and accordingly, operate the voice synthesizer 6.

The voice synthesizer 6 synthesizes voices in accordance with a content of the received e-mail. The thus synthesized voices are output through the speaker 10.

If a transmitter of the received e-mail is an individual, that is, if the received e-mail is a private one, the controller 2 operates the vibrator 22 to inform a user of receipt of an e-mail. As an alternative, or in addition, the controller 2 displays a content of the received e-mail on a display screen of the display unit 8.

If the received e-mail cannot be annunciated through voices, the controller 12 operates the vibrator 22 to inform a user of receipt of the e-mail or displays a content of the received e-mail on a display screen of the display unit 8, without annunciating a content of the received e-mail to a user through voices.

In accordance with the cellular phone, the controller 2 selects the voice synthesizer 6, the vibrator 22 or the display unit 8 in accordance with the first detection signal transmitted from the e-mail analyzer 7, and operates the thus selected annunciator. Hence, annunciation can be appropriately made to a user in accordance with an address and/or characteristics of a received e-mail.

A content of the received e-mail means all information about a received e-mail, such as a name and an address of an e-mail transmitter, a subject matter of an e-mail, date and time at which an e-mail has been received, or sentences of an e-mail.

Figure 2:
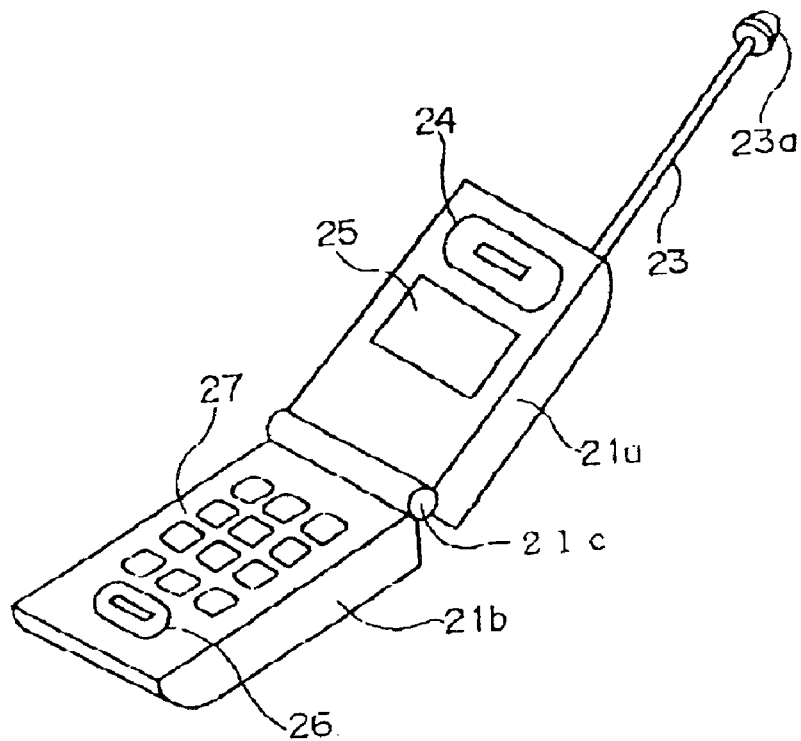
FIG. 2 is a perspective view of a cellular phone not folded, in accordance with the second embodiment of the present invention.
Figure 3:
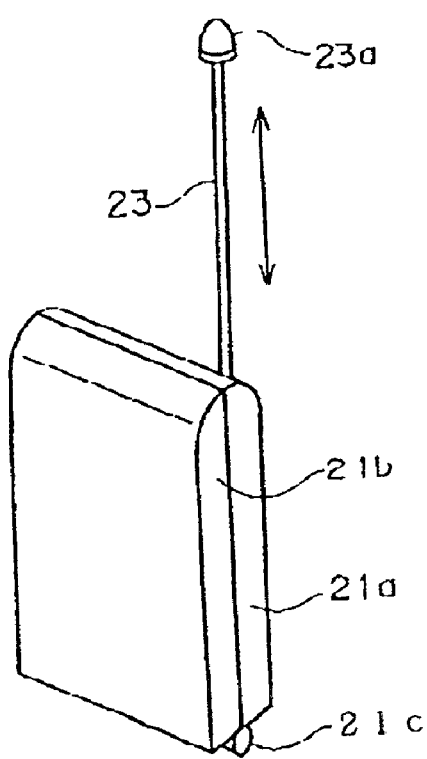
FIG. 3 is a perspective view of a cellular phone folded, in accordance with the second embodiment of the present invention.

FIGS. 2 and 3 are perspective views of a cellular phone in accordance with the second embodiments. As illustrated in FIGS. 2 and 3, the cellular phone in accordance with the second embodiment is a foldable one.

The cellular phone is comprised of an upper half 21a, a lower half 21b, a hinge 21c around which the upper and lower halves 21a and 21b are swingable to each other, an antenna 23, and a helical antenna 23a mounted at a top of the antenna 23.

The antenna 23 is extendible from the upper half 21a and contractible into the upper half 21a.

The upper half 21a includes a speaker 24 and a display screen 25. The lower half 21b includes a receiver 26 and numeral buttons 27.

The upper and lower halves 21a and 21b are rotatable around the hinge 21c. Hence, the cellular phone can be folded, as illustrated in FIG. 3, wherein the upper and lower halves 21a and 21b overlap each other. When the cellular phone is not folded, as illustrated in FIG. 2, the upper and lower halves 21a and 21b make an angle of about 180 degrees.

Figure 4:
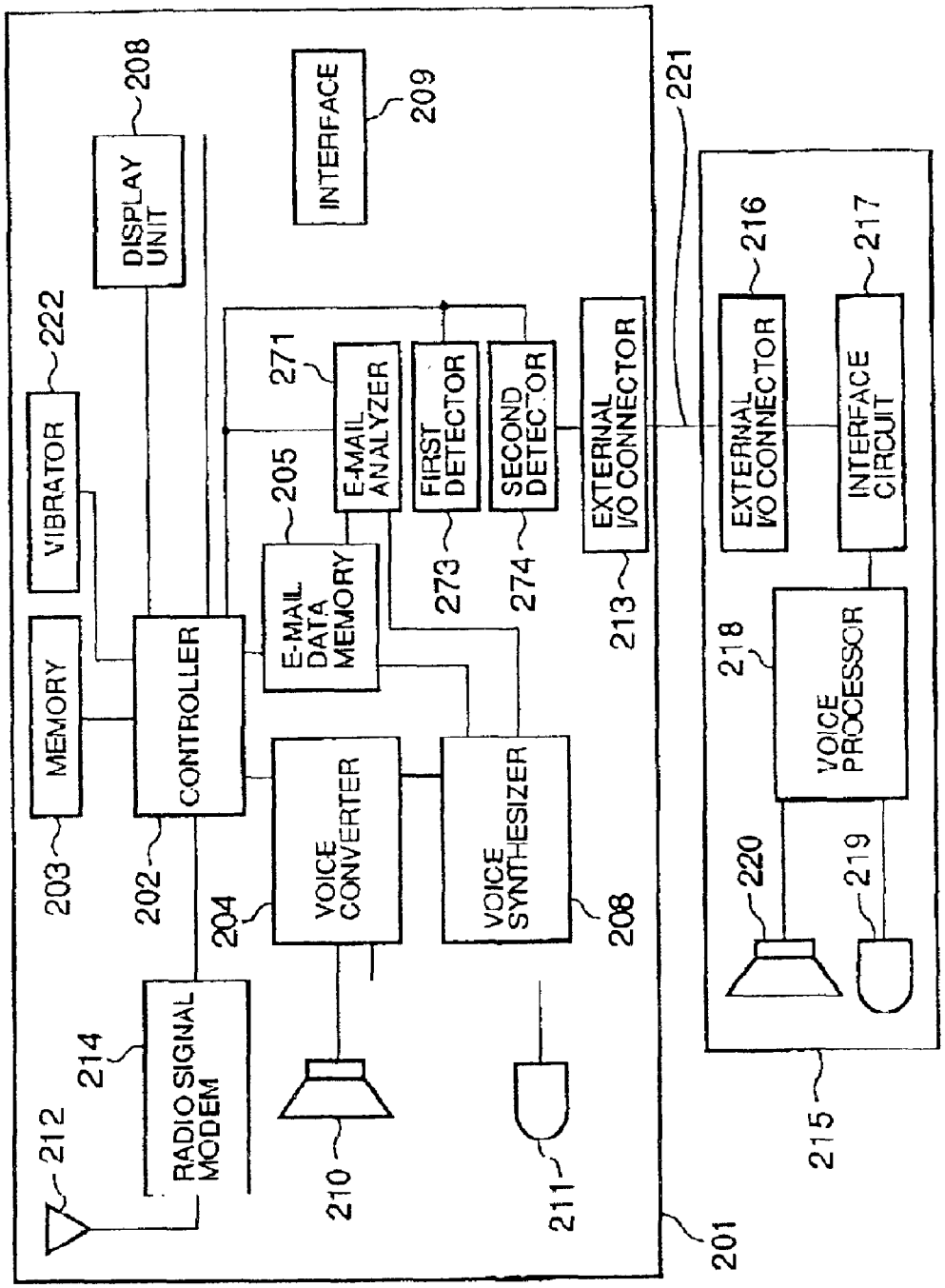
FIG. 4 is a block diagram of a foldable cellular phone in accordance with the second embodiment of the present invention.

FIG. 4 is a block diagram of the cellular phone 201 in accordance with the second embodiment.

The cellular phone 201 is detachably connected to an adapter 215 in a vehicle through a cable 221.

The cellular phone 201 is comprised of an antenna 212 (equivalent to the antenna 23 illustrated in FIGS. 2 and 3) through which a radio signal is received and transmitted, a radio signal modem 214 which modulates a radio signal to be transmitted therefrom and demodulates a received radio signal, a controller 202 comprised of LSI and receiving demodulated radio signals from the radio signal modem 1, a memory 203 storing data such as data indicating conditions in which the cellular phone is set, a voice converter 204 which converts radio signals into voice signals when a received radio signal is comprised of voice signals, an e-mail data memory 205 storing content of received e-mails, a voice synthesizer 206 which synthesizes voices when a content of a received e-mail is to be output through voices, a speaker 210 which outputs the voice signals converted by the voice converter 204, through voices synthesized by the voice synthesizer 206, a microphone 211 which collects voices of a user, an e-mail analyzer 271 which detects an address of a transmitter of a received e-mail and characteristics of a received e-mail, and transmits a first detection signal in accordance with the detection, a display unit 208 which displays various data such as a content of a received e-mail, an interface 209 through which a user inputs data into the controller 202, a vibrator 222 which vibrates a body of the cellular phone, a first detector 273 which detects whether the cellular phone 201 is folded or not, and transmits a second detection signal in accordance with the detection, a second detector 274 which detects whether the cellular phone 201 is connected to the adapter 215 or not, and transmits a third detection signal in accordance with the detection, and an external I/O connector 213 to which the adapter 215 is connected through the cable 221.

The adapter 15 is comprised of an external I/O connector 216 to be connected to the cellular phone 201 through the cable 221, an interface circuit 217 electrically connected to the external I/O connector 216, a microphone 219 which collects voices of a user, a voice processor 218 which processes voices of a user, input through the microphone 219, and a speaker 220 through which voices synthesized by the voice synthesizer 206 are output.

The cellular phone 201 in accordance with the second embodiment operates as follows.

When an e-mail is received in the cellular phone 201, the e-mail analyzer 271 detects an address of a transmitter and characteristics of the received e-mail, and transmits the first detection signal indicative of the thus detected address and characteristics, to the controller 202.

The first detector 273 detects whether the cellular phone 201 is folded or not, and transmits the second detection signal in accordance with a result of the detection.

The second detector 274 detects whether the cellular phone 201 is connected to the adapter 215 or not, and transmits the third detection signal in accordance with a result of the detection. Judgment as to whether the cellular phone 201 is connected to the adapter 215 is made by detecting whether the external I/O connector 213 of the cellular phone 201 is connected to the external I/O connector 216 of the adapter 215 through the cable 221.

The first to third detection signals are transmitted to the controller 202.

On receipt of the first to third detection signals, the controller 202 operates the voice synthesizer 206 to annunciate a content of the received e-mail to a user through voices via the speaker 210 and/or 220, operates the vibrator 222 for vibrating a body of the cellular phone 201 to inform a user of receipt of an e-mail, or displays a content of the received e-mail on a display screen of the display unit 208, in accordance with the first to third detections signals.

Figure 5:
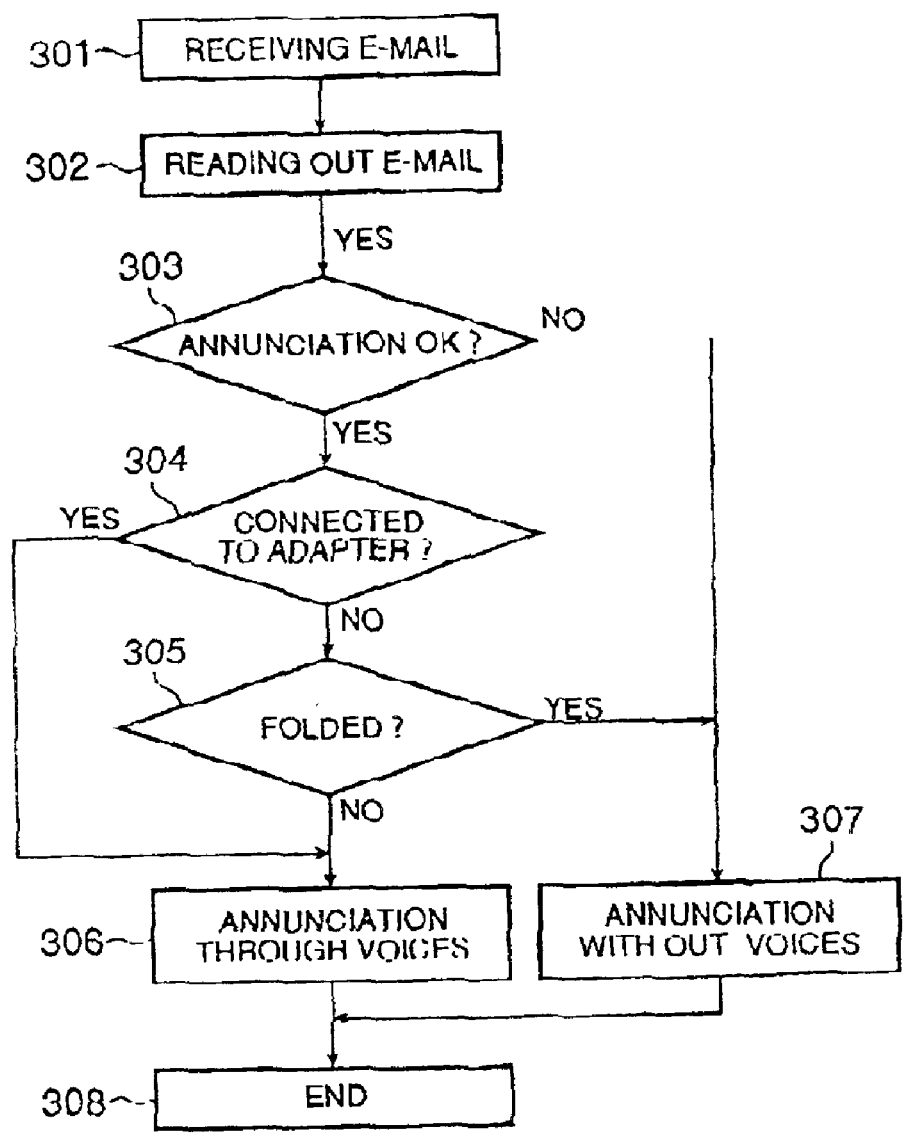
FIG. 5 is a flow chart showing an operation of the cellular phone in accordance with the second embodiment of the present invention.

FIG. 5 is a flow chart showing steps for making annunciation to a user from the cellular phone 201.

Hereinbelow is explained an operation of the cellular phone 201 with reference to FIG. 5.

After the cellular phone 201 has received an e-mail in step 301, the received e-mail is read out of the e-mail data memory 205, in step 302.

Then, the controller 202 takes an e-mail address of a transmitter out of data indicated in the first detection signal transmitted from the e-mail analyzer 271, and judges whether the address is an address which allows annunciation to a user through voices, in step 303.

If the address is not such an address (NO in step 303), the controller 202 informs a user only of receipt of an e-mail without annunciating a content of the received e-mail to a user through voices synthesized by the voice synthesizer 206, in step 307.

For instance, the controller 202 informs a user of receipt of an e-mail by operating the vibrator 222 for vibrating a body of the cellular phone 201, or by turning on light emitting diodes (not illustrated) incorporated in the cellular phone 201.

Thus, the steps for annunciating receipt of an e-mail to a user are completed, in step 308.

If the received e-mail had an address which allows annunciation to a user through voices (YES in step 303), the controller 202 judges whether the cellular phone 201 is connected to the adapter 215, based on the third detection signal transmitted from the second detector 274, in step 304.

If the cellular phone 201 is connected to the adapter 215 (YES in step 304), the controller 202 informs a user of receipt of an e-mail, and then, outputs a content of the received e-mail through voices synthesized by the voice synthesizer 206, via the speaker(s) 210 and/or 220, in step 306.

A content of an e-mail to be output through voices may be designed in advance to include not only sentences of a received e-mail, but also data about a received e-mail. Data about a received e-mail includes, for instance, an address of a transmitter, a subject of an e-mail, date and time at which an e-mail has been received, and whether a file is attached thereto.

A content of the received e-mail may be not only output through voices synthesized by the voice synthesizer 206, via the speaker 210, but also displayed on a display screen of the display unit 208.

If the cellular phone 201 is not connected to the adapter 215 (NO in step 304), the controller 202 judges whether the cellular phone 201 is folded or not, based on the second detection signal transmitted from the first detector 273, in step 305.

If the cellular phone 201 is folded (YES in step 305), the controller 202 assumes that the cellular phone 201 is not in use, and the controller 202 informs a user only of receipt of an e-mail without annunciating a content of the received e-mail to a user through voices synthesized by the voice synthesizer 206, in step 307.

Thus, the steps for annunciating receipt of an e-mail to a user are completed, in step 308.

If the cellular phone 201 is not folded (NO in step 305), the controller 202 assumes that the cellular phone 201 is in use, and then, the controller 202 informs a user of receipt of an e-mail, and outputs a content of the received e-mail through voices synthesized by the voice synthesizer 206, via the speaker(s) 210 and/or 220, in step 306.

A content of the received e-mail may be not only output through voices synthesized by the voice synthesizer 206, via the speakers 210 and/or 220, but also displayed on a display screen of the display unit 208.

Thus, the steps for annunciating receipt of an e-mail to a user are completed, in step 308. The cellular phone 201 is back into a stand-by mode wherein the cellular phone 201 awaits a next e-mail.

In the cellular phone 201 in accordance with the second embodiment, on receipt of an e-mail, the controller 202 operates the voice synthesizer 206 to annunciate a content of the received e-mail to a user through voices via the speaker 210 and/or 220, operates the vibrator 222 for vibrating a body of the cellular phone 201 to inform a user of receipt of an e-mail, or displays a content of the received e-mail on a display screen of the display unit 208, in accordance with the first to third detections signals.

Thus, when a user cannot manipulate the cellular phone 201, because he/she is driving a car, for instance, a content of a received e-mail is annunciated to a user through synthesized voices without necessity for a user to carry out any steps to do so.

On the other hand, when a user can manipulate the cellular phone 201, he/she can set the cellular phone 201 such that annunciation of a content of a received e-mail through synthesized voices is not made.

A foldable cellular phone is structurally characterized in that it is usually open when used, and usually closed when not used. Thus, when the cellular phone 201 is put in a bag, for instance, it would be possible to avoid annunciation to a user through voices, by appropriately selecting an annunciator in accordance with the third detection signal transmitted by the second detector 274. Hence, a use can receive annunciation of receipt of an e-mail through voices, only when necessary, without carrying out extra operations.

In the above-mentioned second embodiment, the controller 202 makes annunciation to a user through voices when the controller 202 detects that the cellular phone 201 is not folded, in accordance with the second detection signal. To the contrary, the controller 202 may make annunciation to a user through voices when the controller 202 detects that the cellular phone 201 is folded, in accordance with the second detection signal A user may select any of the first to third detection signals to make annunciation to a user through voices. That is, a user may select all of the first to third detection signals to make annunciation to a user through voices in a manner as mentioned in the second embodiment, or may select any one or two of the first to third detection signals to do the same.

In the above-mentioned second embodiment, all data of a received e-mail is informed to a user. However, only a part of data of a received e-mail, such as an address of a transmitter of a received e-mail or a subject of a received e-mail, may be annunciated to a user through voices. If a user frequently receives an e-mail including long sentences, a user may set the cellular phone 201 in such a manner that only a subject of a received e-mail is annunciated to a user through voices, in which case, a user may further set the cellular phone 201 such that a content of a particular e-mail is annunciated to a user through voices by actuating a particular button or making the controller 202 recognize a voice of a user, for instance. This eliminates necessity of reading out junk e-mails.

Figure 6:
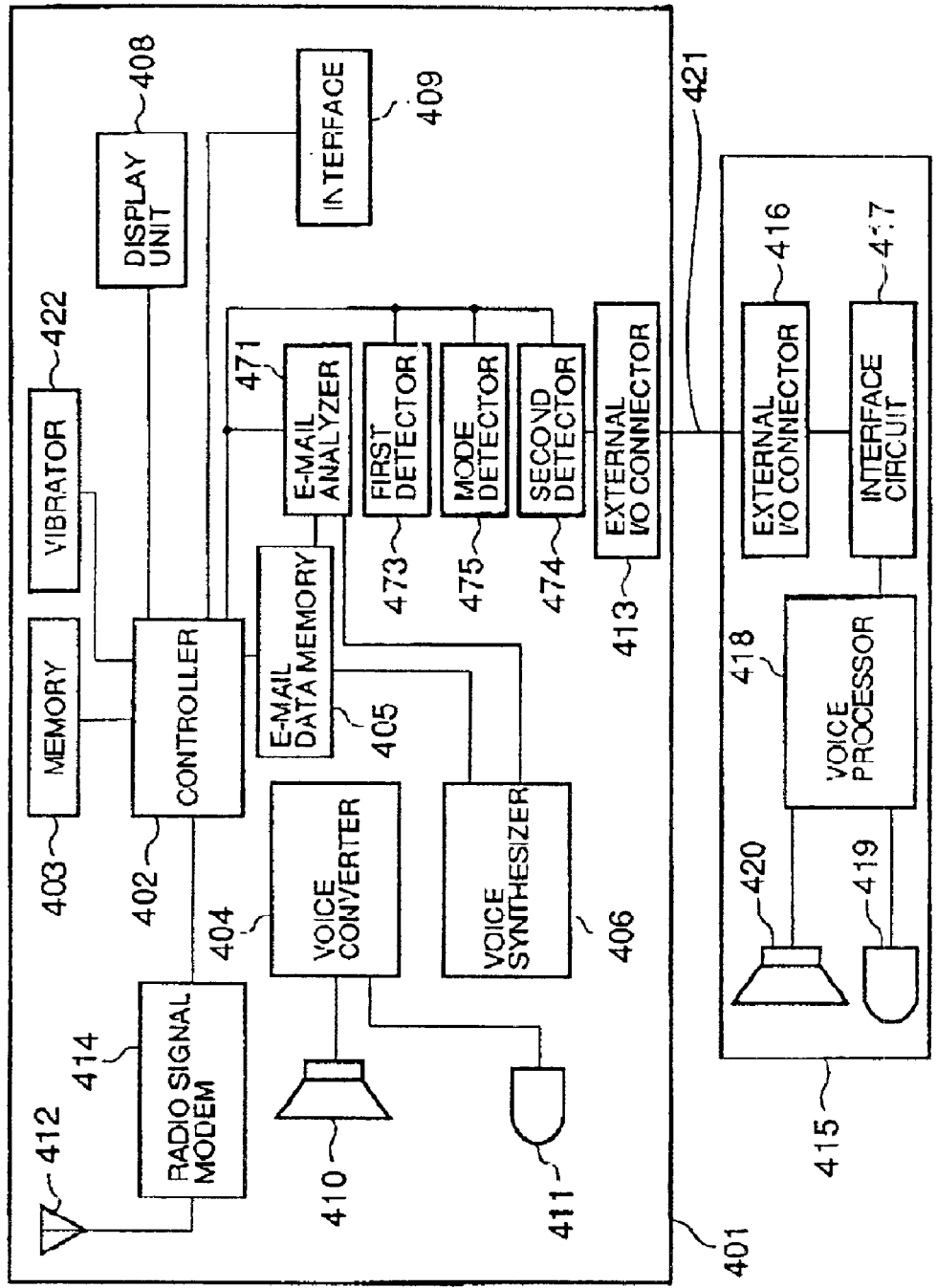
FIG. 6 is a block diagram of a foldable cellular phone in accordance with the third embodiment of the present invention.

FIG. 6 is a block diagram of a cellular phone 401 in accordance with the third embodiment.

The cellular phone 401 is of foldable type like the cellular phone 201 in accordance with the second embodiment, illustrated in FIG. 4.

The cellular phone 401 is detachably connected to an adapter 415 in a vehicle through a cable 421.

The cellular phone 401 is comprised of an antenna 412 through which a radio signal is received and transmitted, a radio signal modem 414 which modulates a radio signal to be transmitted therefrom and demodulates a received radio signal, a controller 402 comprised of LSI and receiving demodulated radio signals from the radio signal modem 1, a memory 403 storing data such as data indicating conditions in which the cellular phone is set, a voice converter 404 which converts radio signals into voice signals when a received radio signal is comprised of voice signals, an e-mail data memory 405 storing content of received e-mails, a voice synthesizer 406 which synthesizes voices when a content of a received e-mail is to be output through voices, a speaker 410 which outputs the voice signals converted by the voice converter 404, through voices synthesized by the voice synthesizer 406, a microphone 411 which collects voices of a user, an e-mail analyzer 471 which detects an address of a transmitter of a received e-mail and characteristics of a received e-mail, and transmits a first detection signal in accordance with the detection, a display unit 408 which displays various data such as a content of a received e-mail, an interface 409 through which a user inputs data into the controller 402, a vibrator 422 which vibrates a body of the cellular phone, a first detector 473 which detects whether the cellular phone 401 is folded or not, and transmits a second detection signal in accordance with the detection, a second detector 474 which detects whether the cellular phone 401 is connected to the adapter 415 or not, and transmits a third detection signal in accordance with the detection, a mode detector 475 which detects which mode the cellular phone 401 is in, and transmits the fourth detection signal in accordance with a result of the detection, and an external I/O connector 413 to which the adapter 415 is connected through the cable 421.

The cellular phone 401 in accordance with the third embodiment further includes the mode detector 417 in comparison with the cellular phone 201 in accordance with the second embodiment.

The cellular phone 401 may be set into various modes such as a drive mode and a manner mode. If the cellular phone 401 is set in a drive mode, a message that a user is now driving a car, and hence, he/she cannot respond to a call is transmitted to a caller, when a user receives a call while he/she is driving a car. If the cellular phone is set in a manner mode, a bell or voice indicating receipt of a call or an e-mail is not made, even if a call or an e-mail is received. A manner mode is suitable when a user attends to a meeting, for instance.

A user can set the cellular phone 401 into his/her desired mode through the interface 409. The mode detector 475 detects which mode the cellular phone 401 is set in, and transmits a fourth detection signal indicating a result of the detection, to the controller 402.

The adapter 415 is comprised of an external I/O connector 416 to be connected to the cellular phone 401 through the cable 421, an interface circuit 417 electrically connected to the external I/O connector 416, a microphone 419 which collects voices of a user, a voice processor 418 which processes voices of a user, input through the microphone 419, and a speaker 420 through which voices synthesized by the voice synthesizer 406 are output.

Figure 7:
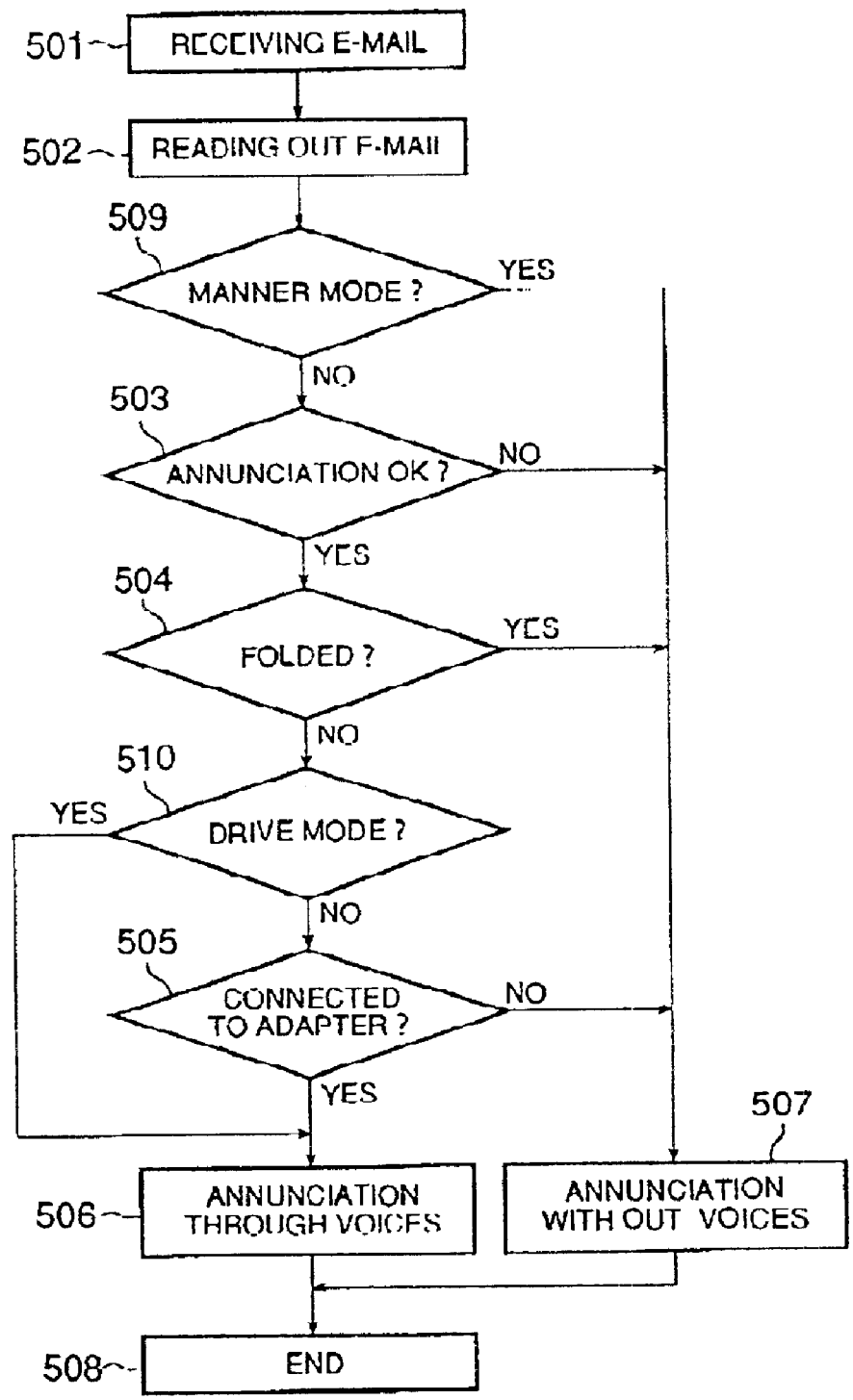
FIG. 7 is a flow chart showing an operation of the cellular phone in accordance with the third embodiment of the present invention.

FIG. 7 is a flow chart showing steps for making annunciation to a user from the cellular phone 401.

Hereinbelow is explained an operation of the cellular phone 401 with reference to FIG. 7.

After the cellular phone 401 has received an e-mail in step 501, the received e-mail is read out of the e-mail data memory 405 in step 502.

Then, the controller 402 judges whether the cellular phone 401 is set in a manner mode, based on the fourth detection signal transmitted from the mode detector 475, in step 509.

If the cellular phone 401 is set in a manner mode (YES in step 509), the controller 402 informs a user only of receipt of an e-mail in a predetermined manner without making annunciation of a content of a received e-mail through synthesized voices, in step 507.

Thus, the steps for annunciating receipt of an e-mail to a user are completed, in step 508.

If the cellular phone 401 is not set in a manner mode (NO in step 509), the controller 402 takes an e-mail address of a transmitter out of data indicated in the first detection signal transmitted from the e-mail analyzer 471, and judges whether the address is an address which allows annunciation to a user through voices, in step 503.

If the address is an address which allows annunciation to a user through voices (YES in step 503), the controller 402 judges whether the cellular phone 401 is folded or not, based on the second detection signal transmitted from the first detector 473, in step 504.

If the cellular phone 401 is folded (YES in step 504), the controller 402 assumes that the cellular phone 401 is not in use, and the controller 402 informs a user only of receipt of an e-mail without annunciating a content of the received e-mail to a user through voices synthesized by the voice synthesizer 406, in step 507.

Thus, the steps for annunciating receipt of an e-mail to a user are completed, in step 508.

If the cellular phone 401 is not folded (NO in step 504), the controller 402 judges whether the cellular phone 401 is set in a drive mode, based on the fourth detection signal transmitted from the mode detector 475, in step 510.

If the cellular phone 401 is set in a drive mode (YES in step 510), the controller 402 informs a user of receipt of an e-mail, and outputs a content of the received e-mail through voices synthesized by the voice synthesizer 406, via the speaker(s) 410 and/or 420, in step 506.

Thus, the steps for annunciating receipt of an e-mail to a user are completed, in step 508.

If the cellular phone 401 is not set in a drive mode (NO in step 510), the controller 402 judges whether the cellular phone 401 is connected to the adapter 415, based on the third detection signal transmitted from the second detector 474, in step 505.

If the cellular phone 401 is connected to the adapter 415 (YES in step 505), the controller 402 informs a user of receipt of an e-mail, and then, outputs a content of the received e-mail through voices synthesized by the voice synthesizer 406, via the speaker(s) 410 and/or 420, in step 506.

A content of the received e-mail may be not only output through voices synthesized by the voice synthesizer 406, via the speaker(s) 410 and/or 420, but also displayed on a display screen of the display unit 408.

If the cellular phone 401 is not connected to the adapter 415 (NO in step 505), the controller 402 assumes that the cellular phone 401 is not in use, and the controller 402 informs a user only of receipt of an e-mail without annunciating a content of the received e-mail to a user through voices synthesized by the voice synthesizer 406, in step 507.

Thus, the steps for annunciating receipt of an e-mail to a user are completed, in step 508. The cellular phone 401 is back into a stand-by mode wherein the cellular phone 401 awaits a next e-mail.

The cellular phone 401 provides not only advantages obtained by the cellular phone 201 in accordance with the second embodiment, but also advantages that annunciation to a user through voices may be turned on or off in accordance with a mode in which the cellular phone 401 is set in.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-147733 filed on May 19, 2000 including specification, claims, drawings and summary is incorporated herein by reference in its entirety.

What is claimed is:

1. A cellular phone comprising:
 (a) at least two annunciators each of which informs a user of at least one of receipt of an e-mail and contents of a received e-mail;
 (b) an e-mail analyzer which detects an address of a transmitter of said received e-mail and characteristics of said received e-mail in order to detect whether the user should be informed of the contents of said received e-mail, and transmits a first detection signal in accordance with the detection;
 (c) a first detector which detects whether said cellular phone is folded, and transmits a second detection signal in accordance with the detection;
 (d) a mode detector that detects whether the cellular phone is in annunciation through voice mode or annunciation without voice mode, and transmits a third detection signal in accordance with the detection; and
 (e) a controller which selects and operates one of said two annunciators in accordance with said first, second and third detection signals.

2. The cellular phone as set forth in claim 1, wherein each of said annunicators is comprised of at least one of:
 (a1) a voice synthesizer which synthesizes voices indicating a content of said received e-mail;
 (a2) a display unit which displays a content of said received e-mail on a display screen; and
 (a3) an informer which informs a user of receipt of an e-mail.

3. A cellular phone comprising:
 (a) at least two annunciators each of which informs a user of at least one of receipt of an e-mail and content of a received e-mail;
 (b) a first detector which detects whether said cellular phone is folded, and transmits a first detection signal in accordance with the detection;
 (c) a second detector which detects whether said cellular phone is connected to an adapter in a vehicle, and transmits a second detection signal in accordance with the detection;
 (d) a mode detector that detects whether the cellular phone is in annunciation through voice mode or annunciation without voice mode, and transmits a third detection signal in accordance with the detection; and
 (e) a controller which selects and operates one of said two annunciators in accordance with said first, second and third detection signals.

4. The cellular phone as set forth in claim 3, wherein each of said annunciators is comprised of at least one of:
 (a1) a voice synthesizer which synthesizes voices indicating a content of said received e-mail;
 (a2) a display unit which displays a content of said received e-mail on a display screen; and
 (a3) an informer which informs a user of receipt of an e-mail.

5. The cellular phone as set forth in claim 4, wherein said controller operates said voice synthesizer when said cellular phone is connected to said adapter.

6. The cellular phone as set forth in claim 4, wherein said controller operates said informer when said cellular phone is not connected to said adapter and said cellular phone is folded.

7. The cellular phone as set forth in claim 4, wherein said controller operates said voice synthesizer when said cellular phone is not connected to said adapter and said cellular phone is not folded.

8. A cellular phone comprising:
 (a) at least two annunciators each of which informs a user of at least one of receipt of an e-mail and content of a received e-mail;

(b) an e-mail analyzer which detects an address of a transmitter of said received e-mail and characteristics of said received e-mail, and transmits a first detection signal in accordance with the detection;

(c) a first detector which detects whether said cellular phone is folded, and transmits a second detection signal in accordance with the detection;

(d) a second detector which detects whether said cellular phone is connected to an adapter in a vehicle, and transmits a third detection signal in accordance with the detection;

(e) a mode detector that detects whether the cellular phone is in annunciation through voice mode or annunciation without voice mode, and transmits a fourth detection signal in accordance with the detection; and (f) a controller which selects and operates one of said two annunciators in accordance with said first, second, third and fourth detection signals.

9. The cellular phone as set forth in claim 8, wherein each of said annunciators is comprised of at least one of:

(a1) a voice synthesizer which synthesizes voices indicating a content of said received e-mail;

(a2) a display unit which displays a content of said received e-mail on a display screen; and (a3) an informer which informs a user of receipt of an e-mail.

10. The cellular phone as set forth in claim 9, wherein said controller operates said voice synthesizer when said cellular phone is connected to said adapter.

11. The cellular phone as set forth in claim 9, wherein said controller operates said informer when said cellular phone is not connected to said adapter and said cellular phone is folded.

12. The cellular phone as set forth in claim 9, wherein said controller operates said voice synthesizer when said cellular phone is not connected to said adapter and said cellular phone is not folded.

13. A method of operating a cellular phone, comprising the steps of:

(a) detecting an address of a transmitter of a received e-mail and characteristics of said received e-mail, and judging whether contents of said received e-mail should be annunciated to a user by voice synthesizer;

(b1) detecting whether said cellular phone is connected to an adapter in a vehicle;

(b2) if contents of said received e-mail should be annunciated and said cellular phone is connected, reading contents of said received e-mail by voice synthesizer;

(c) detecting whether said cellular phone is folded, when said cellular phone is not connected to said adapter;

(d) contents of said received e-mail should be annunciated, reading contents of said received e-mail by voice synthesizer when said cellular phone is not folded and not connected to said adapter; and (e) informing a user of receipt of said received e-mail, if said contents should not be annunciated.

* * * * *